(No Model.)
P. C. BROWN & T. P. BRAGG.
SULKY PLOW.
No. 350,036. Patented Sept. 28, 1886.
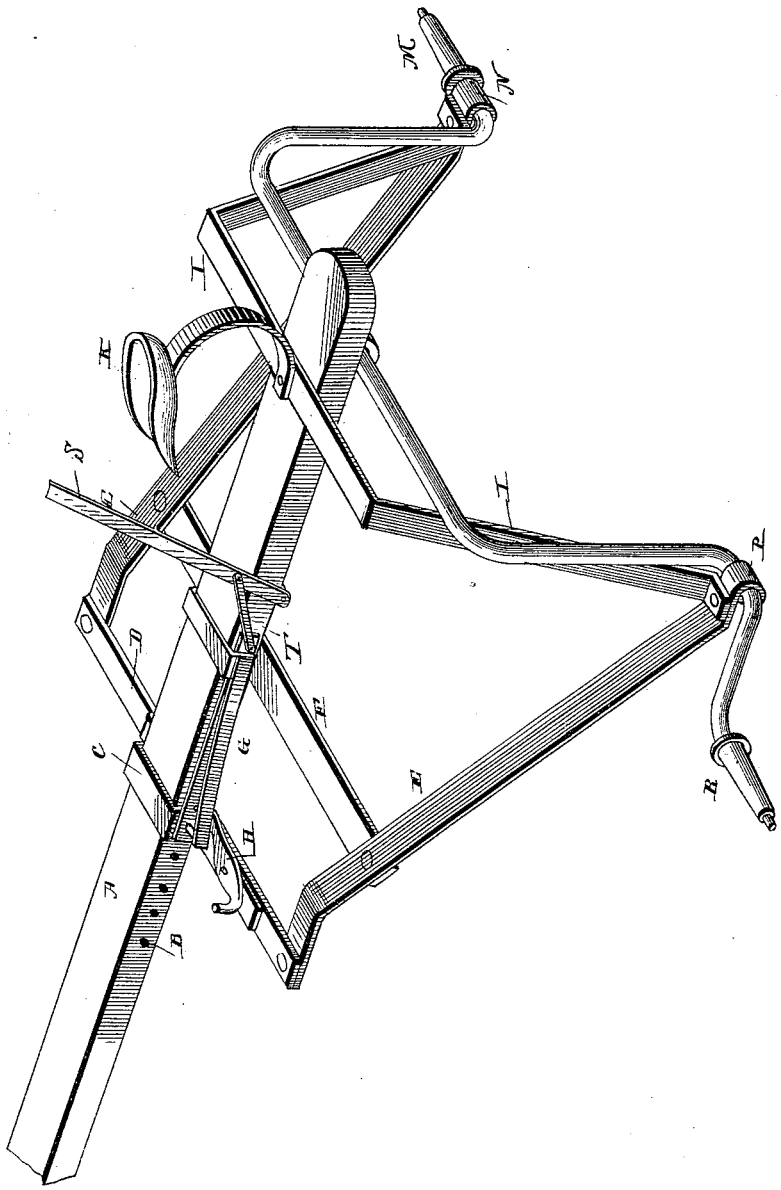
WITNESSES
F. L. Ourand
Jno. S. Fuler
INVENTORS
Peter C. Brown
Thomas P. Bragg
By Frank A. Fouts Attorney

UNITED STATES PATENT OFFICE.

PETER C. BROWN AND THOMAS P. BRAGG, OF ENNIS, TEXAS.

SULKY-PLOW.

SPECIFICATION forming part of Letters Patent No. 350,036, dated September 28, 1886.

Application filed February 24, 1886. Serial No. 192,998. (No model.)

*To all whom it may concern:*

Be it known that we, PETER C. BROWN and THOMAS P. BRAGG, citizens of the United States, residing at Ennis, in the county of Ellis, State of Texas, have invented certain new and useful Improvements in Sulky-Plows, of which the following is a specification, reference being had therein to the accompanying drawing.

This invention relates to certain improvements in cultivators; and it has for its objects to provide simple and efficient means whereby the plow may be caused to run level when breaking upon uneven ground, or, when after breaking, when one wheel is run in a furrow previously formed. These objects we attain by the means illustrated in the accompanying drawing, in which is represented a perspective view of the frame-work of the plow and the mechanism for lowering or elevating the same for the purpose of leveling it.

In said drawing, the letter A indicates draft-beam or center-pole of the cultivator, having a series of apertures or recesses, B, at one side, for the purpose hereinafter explained. To the said beam is secured, by means of a metallic band, C, the forward cross-bar, D, of the inclined backwardly-extending hounds E, which are braced and strengthened by a cross-bar, F, secured at some distance to the rear of the cross-bar D.

To the beam A, at the rear of the band C, is secured a leaf-spring, G, which has its forward end bent at right angles, so as to extend through an opening in the band and project into one of the series of apertures or recesses B, to hold the parts of the cultivator at any position to which they may be adjusted.

The letter H indicates a lever, by means of which the spring is caused to engage and disengage said recesses, to enable the parts to be shifted and adjusted.

Near the rear of the hounds E are rigidly secured the lower ends of a bent cross-bar, I, which extends up over the beam A and carries the driver's seat K.

L indicates the axle, which is arched or bent upward, and which is journaled in a bearing secured to the lower side near the rear end of the beam A. The axle at each side is bent outward, forming a spindle, M, at one side, extending through a bearing, N, at the end of one of the hounds E and at one side of the cultivator. At the other side the axle extends through a bearing, P, at the rear of the other hound. The axle at this end is bent similarly to a crank, and has at its extremity a laterally-extending spindle, R.

S indicates a lever secured to the beam A to the rear of the cross-bar F, and within reach and under the control of the driver, for the purpose of lowering or elevating the frame. The said lever is connected to the locking mechanism by means of a suitable arm.

The spindles pass through the hubs of the wheels, which are secured thereon by nuts or any other means, and the plows are secured to the frame either singly or in gangs, as may be desired.

The operation of the invention is as follows: In breaking ground the parts are adjusted and held as shown in the drawing, in which position the spindles are in the same horizontal plane, enabling the cultivator to travel level over the ground. When one furrow is made, however, and it becomes necessary for one wheel to travel in it, the frame is shifted so as to elevate one wheel and depress the other the proper relative distances to enable the cultivator to retain its level. Thus it will be seen that the furrow may be plowed at any depth within a given limit and still run level over the ground.

Having thus described our invention, what we claim, and desire to secure by Letters Patent, is—

1. The combination, in a cultivator, of the pole or center-beam, the hounds and their cross-bar adapted to slide thereon, the bent frame rigidly attached to said hounds, and the bent axle journaled in bearings on the beam and at the ends of the hounds, the axle at one side having a spindle extending at right angles from it and at the other being bent into the form of a crank having a spindle at its extremity, whereby the wheels may be elevated or depressed for the purpose of leveling the plow, substantially as specified.

2. The combination, with the beam and the hounds attached thereto by a sliding band, of the locking spring and lever, the rigid seat-supporting frame, and the axle journaled to the beam and at the ends of the hounds, the axle being bent at the ends, as described, and provided with spindles for the wheels, the whole arranged to operate substantially as and for the purposes specified.

In testimony whereof we affix our signatures in presence of two witnesses.

PETER C. BROWN.
THOMAS P. BRAGG.

Witnesses:
J. H. WHEAT,
R. G. THOMPSON.